(12) United States Patent
Martino Gonzalez et al.

(10) Patent No.: US 9,896,181 B2
(45) Date of Patent: Feb. 20, 2018

(54) AIRCRAFT REAR STRUCTURE

(71) Applicant: Airbus Operations, S.L., Getafe (ES)

(72) Inventors: Esteban Martino Gonzalez, Getafe (ES); Diego Folch Cortes, Getafe (ES); Pablo Goya Abaurrea, Getafe (ES); Sandra Linares Mendoza, Getafe (ES)

(73) Assignee: Airbus Operations, S.L., Getafe (ES)

( * ) Notice: Subject to any disclaimer, the term of this patent is extended or adjusted under 35 U.S.C. 154(b) by 432 days.

(21) Appl. No.: 14/983,468

(22) Filed: Dec. 29, 2015

(65) Prior Publication Data

US 2016/0185439 A1     Jun. 30, 2016

(30) Foreign Application Priority Data

Dec. 30, 2014 (EP) .................................... 14382588

(51) Int. Cl.
| | |
|---|---|
| *B64C 1/10* | (2006.01) |
| *B64C 1/16* | (2006.01) |
| *B64C 1/26* | (2006.01) |
| *B64C 3/18* | (2006.01) |
| *B64C 5/02* | (2006.01) |

(52) U.S. Cl.
CPC ................. *B64C 1/10* (2013.01); *B64C 1/16* (2013.01); *B64C 1/26* (2013.01); *B64C 3/185* (2013.01); *B64C 5/02* (2013.01)

(58) Field of Classification Search
CPC ..... B64C 1/10; B64C 1/26; B64C 5/00; B64C 5/02
See application file for complete search history.

(56) References Cited

U.S. PATENT DOCUMENTS

| | | | |
|---|---|---|---|
| 6,273,363 B1 * | 8/2001 | Sprenger ................... | B64C 5/02 244/119 |
| 9,187,169 B2 * | 11/2015 | Brown ....................... | B64C 1/26 |
| 2010/0032519 A1 | 2/2010 | Chareyre et al. | |
| 2011/0101163 A1 | 5/2011 | Haack | |
| 2011/0290940 A1 | 12/2011 | Noebel et al. | |
| 2012/0298795 A1 | 11/2012 | Cazals et al. | |
| 2013/0099053 A1 | 4/2013 | Barmichev et al. | |

OTHER PUBLICATIONS

European Search Report, dated Jun. 9, 2015.

* cited by examiner

*Primary Examiner* — Brian M O'Hara

(74) *Attorney, Agent, or Firm* — Greer, Burns & Crain, Ltd.

(57) ABSTRACT

An aircraft rear structure that comprises a rear pressure bulkhead, and a lifting surface located at both sides of the fuselage of the aircraft. The lifting surface comprises spars extending in the longitudinal direction of the lifting surface. The pressure bulkhead is aligned with one of the spars of the lifting surface.

14 Claims, 3 Drawing Sheets

AIRCRAFT REAR STRUCTURE

CROSS-REFERENCES TO RELATED APPLICATIONS

This application claims the benefit of the European patent application No. 14382588.3 filed on Dec. 30, 2014, the entire disclosures of which are incorporated herein by way of reference.

FIELD OF THE INVENTION

The present invention refers to a rear structure comprising a pressure bulkhead of an aircraft. The rear structure is also related to the lifting surfaces located at both sides of the fuselage. For the purpose of simplifying the following description, the term "lifting surface" will be used to describe not only wings, but also stabilizing and/or supporting surfaces, such as horizontal stabilizers or pylons for supporting the engines of the aircraft.

BACKGROUND OF THE INVENTION

A tail structure which adjoins a fuselage section of an aircraft includes a fuselage, lifting surfaces located at both sides of the fuselage such as wings or pylons for supporting the engines of the aircraft or other supporting structures, and a bulkhead unit for pressure-tight sealing of the fuselage section.

The rear pressure bulkhead (RPB) is the element that closes the pressurized area of the aircraft by its very back. It separates the pressurized part of the fuselage which constitutes the cabin allocating the passengers and the non-pressurized rear cone where the empennage, and other lifting surfaces and systems are located.

On conventional curved RPB solutions, this element has a concave shape from the side of the pressurized zone and is substantially hemispherical, so as to provide optimum use of the material of the bulkhead, acting as a membrane, to absorb the load due to the positive pressure difference inside the cabin. This bulkhead configuration requires additional stiffeners and other reinforcements to support the skin and load in case of reverse pressure cases, when there is negative pressure difference in the cabin for which the concave shape is not effective. Also, additional reinforcements are added at cut outs needed to allow the passing of systems pipes and access doors. These reinforcement elements constitute a significant penalty weight on the curved rear pressure bulkhead.

On flat RPB solutions, the structure is not optimized to sustain positive cabin pressure loads as it is not able to work as a membrane, but this solution already includes stiffeners and reinforcement elements that are effective for both positive and negative pressure load cases. Also, these reinforcements on a flat bulkhead are effective to integrate system pipe and access doors. This makes the flat bulkhead solution still competitive compared to the curved one, depending on the importance of these additional requirements.

Conventionally, the pressure bulkhead separates an anterior section of another aft fuselage section, sections corresponding to the pressurized and unpressurized areas of the aircraft, respectively. With this configuration, mainly the structure of the bulkhead assembly should be able, in addition to absorbing pressure loads, to maintain the shape of the fuselage and provide adequate strength to the coupling between the front and rear sections of the fuselage so as suitable for cross stiffening the fuselage.

For this reason, the assembly structure of known curved pressure bulkheads incorporates a frame and splices following the contour of the fuselage and intercostals. These frame and intercostals also resist the membrane reactions that the curved bulkhead transmits to the fuselage cylindrical structure, when pressure is applied. On a flat bulkhead, there are no membrane loads, so the intercostals are not mandatory, and the contour frame can be replaced by a T shape profile, removing the penalty weight and assembly complexity of these elements.

Known fuselages comprise a plurality of frames, stringers and beams, which act as reinforcing members of the aircraft skin. In order to integrate lifting surfaces with fuselage structures, discontinuities are usually performed in the fuselage skin, to allow the passing and continuity of support structures of such lifting surfaces.

Lifting surfaces may be divided into two or three independent parts or can be continuous. When divided they comprise a central box located inside the fuselage and two lateral boxes located at both sides of the fuselage or, as an alternative, the lifting surfaces can be divided into two lateral boxes joined at the symmetry axis of the aircraft. Structural boxes comprise at least a front spar and a rear spar extending in the longitudinal direction of the torsion box, upper and lower skins and ribs extending in the transversal direction of the structural box.

Regarding pylons, a first known configuration may include a pylon extending between both engines and located at a centered position of the height of the cylindrical part of the fuselage. The central part of the pylon is introduced into the fuselage, therefore the configuration implies a discontinuity or, at least, a cut-out in the fuselage skin.

In the known configurations the lifting surfaces are clearly separated from the rear pressure bulkhead, or what is the same, they are located at different sections in the longitudinal axis of the aircraft.

SUMMARY OF THE INVENTION

The aircraft rear structure object of the invention comprises:
  a pressure bulkhead, and
  a lifting surface located at both sides of the fuselage of the aircraft, the lifting surface comprising spars extending in the longitudinal direction of the lifting surface.

The rear structure is characterized in that the pressure bulkhead is aligned with one of the spars of the lifting surface.

A main objective of the invention is to provide a more integrated structure having lighter weight, as the pressure bulkhead can fulfil several functions which also increases design flexibility. Integrating the rear pressure bulkhead with the lifting surface allows the use of the lifting surface as a reinforcement for the bulkhead.

The configuration can be applied to all positions of the lifting surfaces with respect to the fuselage, such as a lower, upper or intermediate position.

Some additional advantages of the invention are the following:

The rear fuselage weight and the rear section size could be reduced if the lifting surface is brought forward to the position occupied by the bulkhead in the state of the art.

Cabin passenger capacity could be increased if the rear pressure bulkhead is moved backwards to the position of the lifting surface.

Other positions different from the known positions of the bulkhead and the lifting surface in the state of the art could be achieved.

Both the structure of the lifting surface and of the bulkhead are mutually reinforced.

Other elements can be integrated, such as a floor beam or even a door, these elements act as additional reinforcements of the bulkhead.

Fewer bulkhead reinforcement elements are needed since the spar of the lifting surface or even the floor beam act as an additional reinforcement element.

The claimed invention is applicable to curved, flat monolithic and flat sandwich rear pressure bulkheads.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
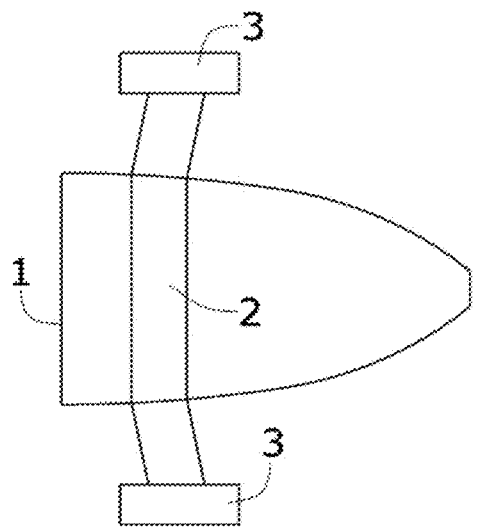
FIG. 1 shows a known configuration of an aircraft rear structure comprising a lifting surface and a rear pressure bulkhead.

FIG. 1 discloses a known structure in which the lifting surface refers to a pylon (2) for supporting the engines (3). The shown structure comprises a pressure bulkhead (1) and a lifting surface, that is to say, a pylon (2) extending between the engines (3). The engines (3) are rear mounted and the aircraft has the rear pressure bulkhead (1) clearly separated from the engine support structure or pylon (2).

It should be appreciated that the concepts described herein relating to an aircraft pylon (2) may also be used for other aircraft lifting surfaces, such as wings, horizontal stabilizers or other structures. Therefore, although the following explanation is also applicable to other lifting surfaces having structural boxes, the following embodiments will refer to pylons (2) for supporting the engines (3) of an aircraft.

The pylon (2) could be a continuous structure but it would be preferable to have a pylon (2) structured with a central and two lateral boxes to ease integration.

Figure 2:
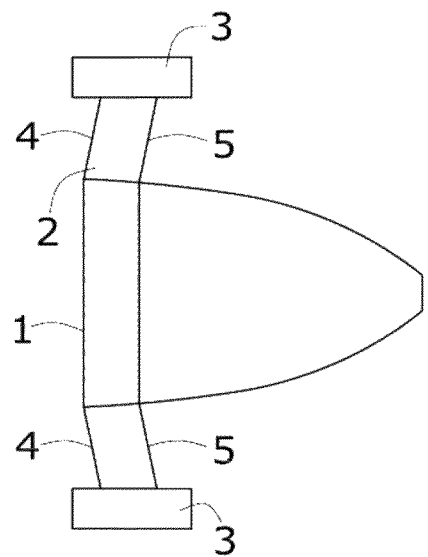
FIG. 2 shows a schematic representation of a plan view of a first embodiment of the rear structure of the invention.
Figure 3:
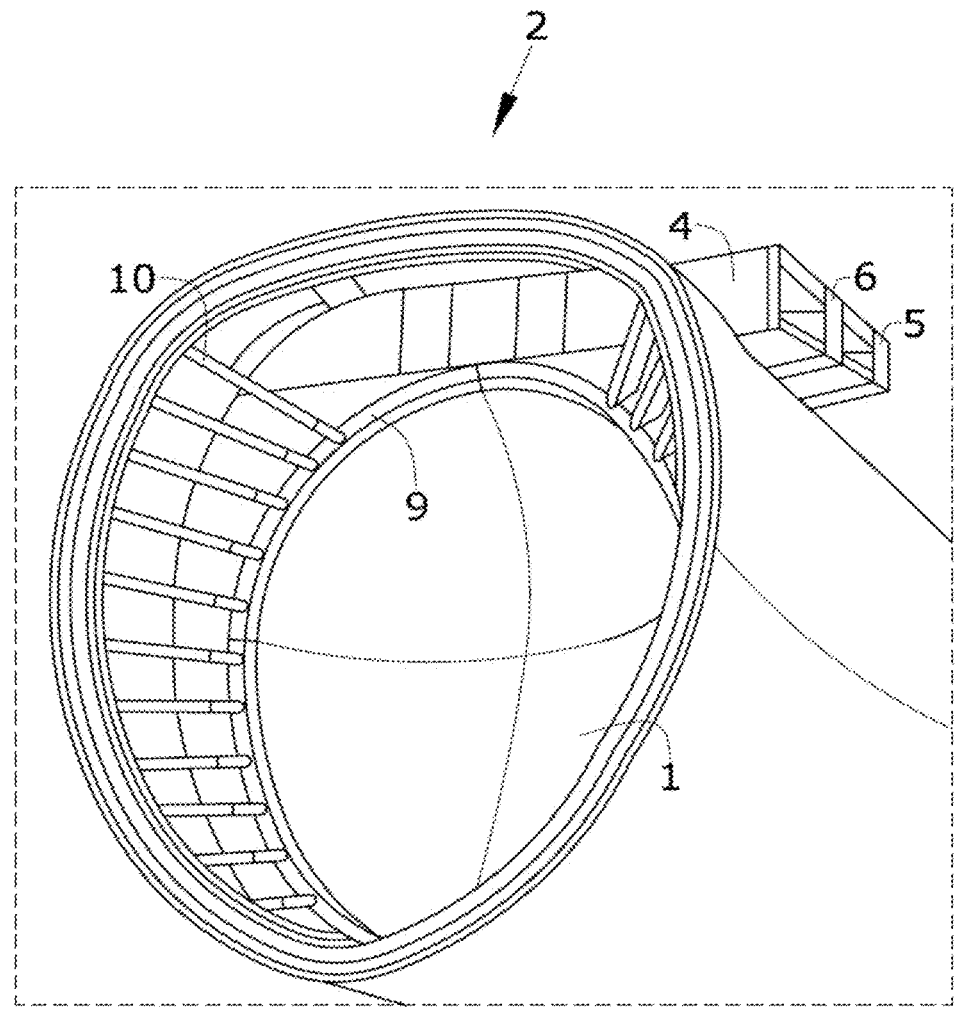
FIG. 3 shows a perspective view of a cross section of the fuselage disclosing another embodiment of the invention shown.

FIGS. 2 and 3 show a first embodiment of the invention, showing a rear pressure bulkhead (1) integrated with the pylon (2). More specifically, the frame (9) of the bulkhead (1) is aligned with the front spar (4) of the pylon (2). FIG. 3 shows a curved bulkhead (1) aligned with the front spar (4). The bulkhead (1) could also be aligned with the rear (5) or an intermediate (6) spar. This solution could require additional intercostals (10) extending between the frame (9) and the fuselage to transmit the membrane loads from the bulkhead (1) to the fuselage.

The alignment could be achieved by integrating all the components, i.e., the bulkhead (1) and the lifting surface spar in one element or, to the contrary, by joining these components together. It has to be understood for this application that a structure is called integrated when all its structural components are manufactured in one shot. Moreover load transfer is improved due to the continuous integrated structure.

Figure 4:
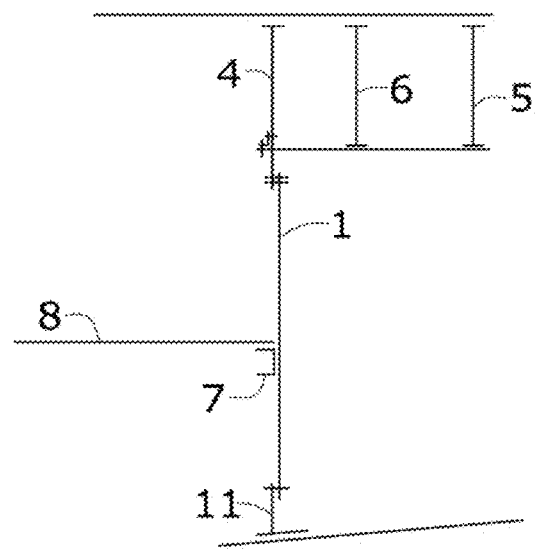
FIG. 4 shows a schematic view of a cross section along the longitudinal axis of the aircraft of another embodiment of the invention.

FIG. 4 shows another embodiment of the invention wherein the rear pressure bulkhead (1) is a monolithic flat bulkhead (1) which is aligned with the front spar (4).

In this embodiment the frame and intercostal are not mandatory as the flat bulkhead is able to carry the pressure loads and maintain the shape and strength of the fuselage. The contour frame can be replaced by a lighter T shape profile (11) to join the flat bulkhead to the fuselage skin at the places where bulkhead is not integrated with the spar of the lifting surfaces, as is the case on the fuselage lower and lateral side on this embodiment. These simplifications reduce the assembly complexity and penalty weight.

In this embodiment the floor beam (7) is also integrated into the bulkhead (1). The advantage of having an integrated floor beam (7) is that it reinforces the bulkhead (1) while also serves as support of the floor (8) of the aircraft. This beam (7) can be directly manufactured in one piece with the bulkhead (1) or joined to the bulkhead (1) panel by rivets, bonding or other attachment means. This way the beams (7) works solidarily with the rest of the flat bulkhead (1) to sustain the pressure and also the beam (7) and the bulkhead (1) provide support for the floor structure (8).

Figure 5:
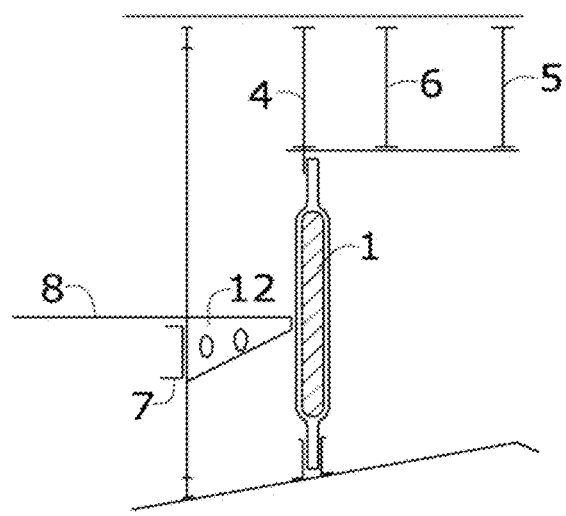
FIG. 5 shows a schematic view of a cross section along the longitudinal axis of the aircraft of another embodiment of the invention.

FIG. 5 shows a third embodiment of the invention wherein the rear pressure bulkhead (1) is a sandwich flat bulkhead (1) which is also aligned with the front spar (4). In this case the integration of the floor (8) is different as the floor beam (7) is more difficult to join to the sandwich panel of the rear pressure bulkhead (1). In this embodiment, it is preferred to separate the floor beam (7) from the bulkhead (1). The floor (8) is being sustained by a cantilever structure (12) independent of the bulkhead (1) and not supported on it.

Although the embodiments show pylons (2) that are located at an upper position with respect to a section of the fuselage, pylons (2) located at a lower position are also possible.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft rear structure comprising:
   a rear pressure bulkhead defining a cross sectional plane,
   a lifting surface located at both sides of a fuselage of the aircraft,
      said lifting surface comprising spars extending in the longitudinal direction of the lifting surface, and said rear pressure bulkhead being substantially vertically aligned with one of the spars of the lifting surface within the cross sectional plane defined by the rear pressure bulkhead.

2. The aircraft rear structure, according to claim 1, wherein the rear pressure bulkhead is integrated with the lifting surface.

3. The aircraft rear structure, according to claim 1, wherein the rear pressure bulkhead is joined to the lifting surface.

4. The aircraft rear structure, according to claim 1, wherein the lifting surface is a continuous structure.

5. The aircraft rear structure, according to claim 1, wherein the lifting surface comprises a central box and two lateral boxes.

6. The aircraft rear structure, according to claim 1, wherein the rear pressure bulkhead is aligned with one of a front spar, a rear spar or an intermediate spar of the lifting surface.

7. The aircraft rear structure, according to claim 1, wherein the rear pressure bulkhead is curved.

8. The aircraft rear structure, according to claim 7, wherein the curved bulkhead comprises a frame aligned with the spar of the lifting surface.

9. The aircraft rear structure, according to claim 8, wherein the curved bulkhead comprises intercostals extending between the frame and the fuselage.

10. The aircraft rear structure, according to claim 1, wherein the rear pressure bulkhead is flat monolithic.

11. The aircraft rear structure, according to claim 10, wherein the flat monolithic bulkhead comprises a T shape profile for joining the bulkhead to the fuselage.

12. The aircraft rear structure, according to claim 10, further comprising a floor beam configured to support a floor integrated into the flat monolithic rear pressure bulkhead.

13. The aircraft rear structure, according to claim 1, wherein the rear pressure bulkhead is sandwich monolithic.

14. The aircraft rear structure, according to claim 13, wherein a floor of the aircraft is sustained by a cantilever structure independent of the bulkhead and not supported on the bulkhead.

* * * * *